Dec. 23, 1941.  F. H. DALE  2,267,553
AUTOMATIC SAW FILING MACHINE
Filed Aug. 26, 1939  2 Sheets-Sheet 1

INVENTOR.
Frederick H. Dale
BY
ATTORNEYS

Dec. 23, 1941.　　　F. H. DALE　　　2,267,553
AUTOMATIC SAW FILING MACHINE
Filed Aug. 26, 1939　　　2 Sheets-Sheet 2
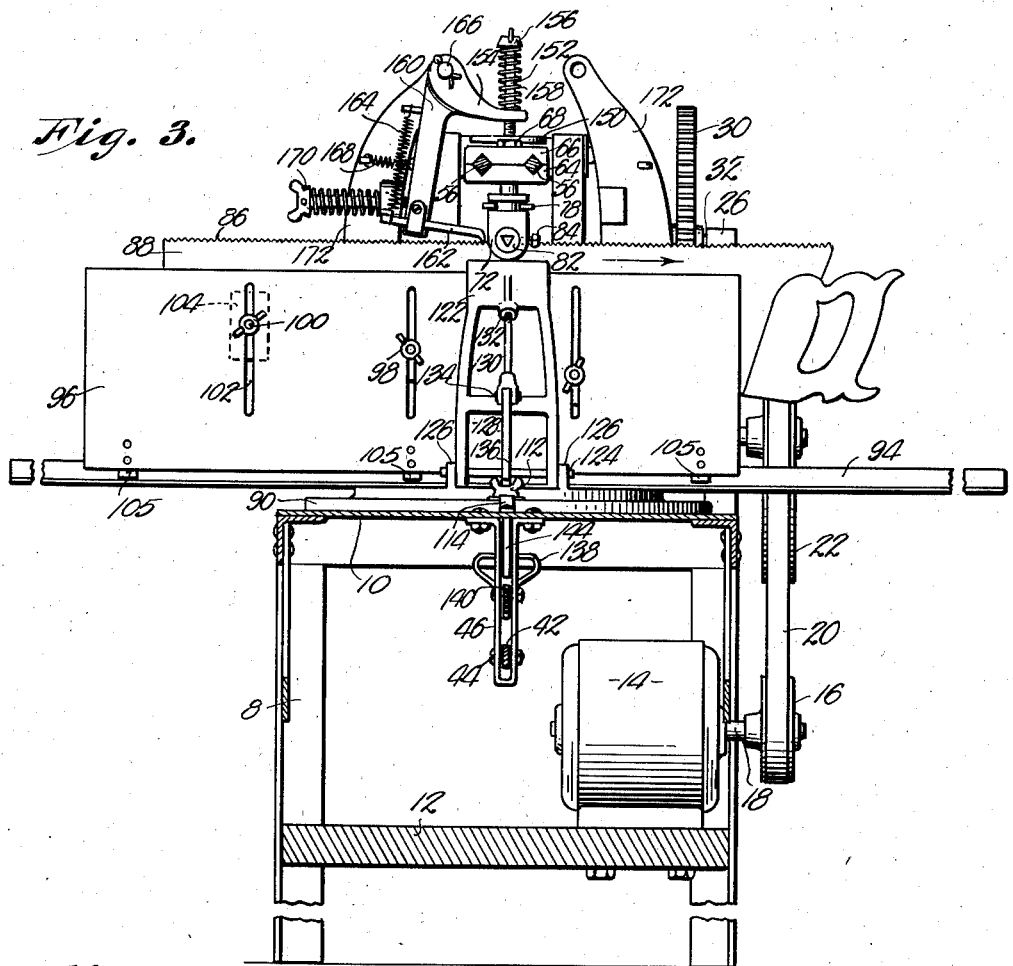
INVENTOR.
Frederick H. Dale
BY
Howry Hamilton
ATTORNEYS Patented Dec. 23, 1941

2,267,553

UNITED STATES PATENT OFFICE 2,267,553

AUTOMATIC SAW FILING MACHINE

Frederick H. Dale, Manhattan, Kans., assignor of one-half to Rolla E. Long, Manhattan, Kans.

Application August 26, 1939, Serial No. 292,087

2 Claims. (Cl. 76—34)

This invention relates to saw filing machines of the power driven type and has for its primary object the provision of equipment for filing the teeth of saws through the employment of automatic equipment which is effective in operation, simple and durable in construction, not intricate or complicated and efficient to the end that the teeth of the saw being treated are effectively formed and filed with a minimum amount of attention from the operator.

One of the important aims of this invention is to provide an automatic saw filing machine wherein is incorporated unique and effective means for periodically gripping the saw adjacent to the zone of treatment so that high speed cutting may occur without injury to the saw and as the teeth of the saw remain in proper alignment.

This invention has for a still further object the provision of a saw filing machine wherein is embodied a special file holder and means for mounting said holder so that it will travel vertically toward and from the saw being filed and transversely there-across as associated gripping jaws are moved to and from a saw engaging position for the purpose of allowing a periodic forward movement of the saw as the file is lifted therefrom.

A further object of this invention is the provision of a saw filing machine capable of being set and allowed to continuously operate without the attention of an operator and which comprises means for holding and actuating a file, means for periodically gripping the saw being treated, means for carrying and advancing the saw in step-by-step movements, and mechanism for interconnecting all of the aforesaid means with a motor or similar source of power.

This invention contemplates other objects in addition to those set down above and these additional aims will appear during the course of the following specification, referring to the accompanying drawings, wherein:

Fig. 3 is a vertical, cross sectional view through the machine taken on line III—III of Fig. 2.

Fig. 4 is a horizontal, fragmentary, sectional view through a portion of the machine taken on line IV—IV of Fig. 2, and Fig. 5 is a fragmentary, perspective, detailed view of the sectional rail for the saw carrier.

Figure 1:
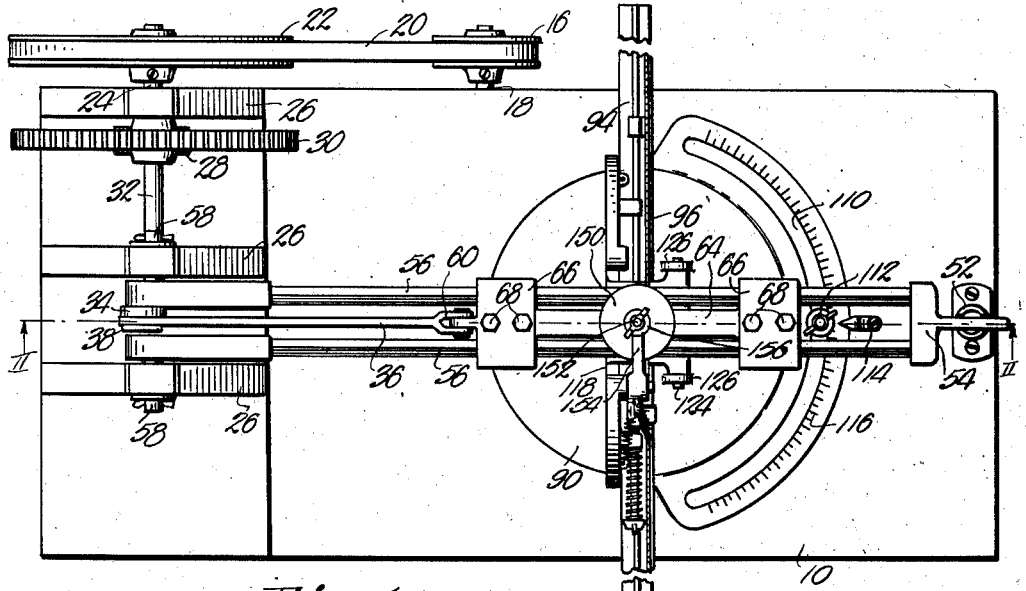
Figure 1 is a top plan view of a saw filing machine made in accordance with the present invention.

The illustrated embodiment of the invention that has been chosen for description comprises a frame 8 that is in the form of a bench or table, the top 10 of which is supported above the floor. A shelf 12 carries an ordinary electric motor 14 that has a pulley wheel 16 mounted upon the motor shaft 18. A belt 20 passes over pulley 16 and a relatively large grooved pulley 22 that is mounted upon shaft 24 journaled in bearings 26 mounted upon top 10 of frame 8. Shaft 24 has pinion 28 keyed or otherwise secured thereto for rotation therewith, and gear 30 is in mesh with this said pinion 28. Gear 30 is mounted upon shaft 32 which, like shaft 24, is journaled in bearings 26. A crank 34 is secured to one end of shaft 32; this crank 34 is relatively short and the free end thereof is fastened to a flat connecting rod 36 and to the upper end of a link 38. The lower end of link 38 is pivotally secured as at 40 to rocker arm 42 that swings about the axis of pintle 44 carried by bracket 46. Pintle 44 is intermediate the ends of rocker arm 42 and the end of said rocker arm opposite to that connected to the lower end of link 38 is pivotally joined as at 48 to a vertically reciprocating rod 50 mounted in tube 52.

While the lower end of rod 50 is joined to rocker arm 42, the upper end thereof is secured to coupling 54 which serves as a medium of joining one end of spaced apart polygonal bars 56 to the upper end of rod 50. The other ends of these said bars 56 are pivotally carried by the upper portions of two of the aforesaid bearings 26. Reference to Figure 1 will reveal the manner in which these said ends of bars 56 are pivotally joined to bearings 26 through the use of stub shafts 58. The upper end of link 38 is disposed between bars 56 and the connecting rod 36 rests between these bars 56 so that its bifurcated end 60 may engage the file holder designated generally by the numeral 62. This file holder comprises a head 64 slidably mounted upon bars 56. Caps 66 are held in place by machine bolts 68, and the openings through head 64 and caps 66 are of the same cross-sectional contour as the similar contour of bars 56 so that rotation is not permitted and lateral displacement of file 70 therefore is reduced to a minimum.

File 70 is mounted in a pair of specially formed blocks 72, one of which is adjacent to each end of head 64. Each block 72 has a cavity 74 formed therein for the reception of a depending pin 76 which serves as a guide when blocks 72 are reciprocated vertically.

Figure 2:
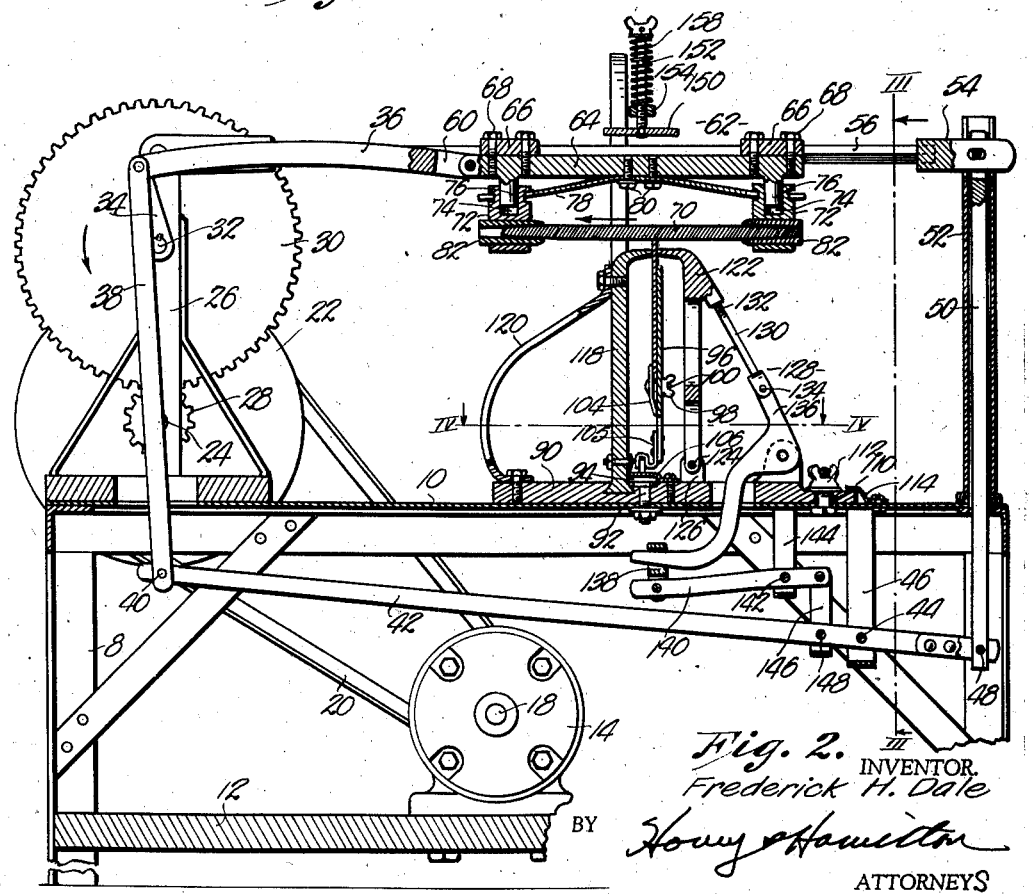
Fig. 2 is a vertical, sectional view through the machine taken on line II—II of Fig. 1.

A leaf spring 78 longitudinally arched as shown in Fig. 2 and secured as at 80 to the under side of head 64, has the bifurcated ends thereof respectively in engagement with blocks 72. Each of these blocks is provided with an annular groove for the reception of the bifurcated ends of spring 78; thus spring 78 yieldably maintains file 70 in an operative position.

Bushings 82 fitted upon the ends of file 70 are carried in transverse openings formed through blocks 72.

A set screw 84 adjustably mounted in at least one of blocks 72 permits the operator to dispose the converging sides of file 70 in the proper position for filing the teeth 86 of saw 88.

The saw carrier comprises a turn-table 90 mounted directly upon the top 10 of frame 8 and movable about a pivot bolt 92. A sectional rail 94 supports plate 96 upon which saw 88 is directly mounted. Thumb nuts 98 in screw-threaded engagement with bolts 100 which pass through slots 102, cooperate with clips 104 in holding saw 88. Plate 96 has a series of channeled brackets 105, each of which is in slidable engagement with the web of rail 94; thus plate 96 with its saw 88 may be moved longitudinally along rail 94 as the filing operation progresses. In some instances it is desirable to remove rail 94 and to facilitate handling the machine this rail 94 is made sectional. The adjacent ends of rail 94 are formed as shown in Fig. 5 so that the fixture 106 may serve to hold the two sections of the rail together as the plate 96 is mounted thereon. Notches 108 receive fixture 106 as shown in Fig. 2.

Turn-table 90 has an arcuate slot 110 formed therein which is concentric with the axis of rotation about pivot bolt 92. A lock bolt and nut assembly 112 carried by top 10 serves to secure turn-table 90 in the desired position after pointer 114 has been associated with the desired designation on scale 116 which is etched or otherwise formed on the upper face of turn-table 90 close to slot 110.

It is important that saw 88 be rigidly gripped adjacent to the tooth being acted upon by file 70 and since there is means in this machine for advancing saw 88, the gripping elements must periodically engage the saw while file 70 travels through its path of movement in one direction. The gripping means illustrated in the accompanying drawings comprises a stationary jaw 118 mounted directly upon turn-table 90 and braced against displacement by member 120 and a movable jaw 122 pivotally mounted upon turn-table 90 through the medium of pin 124 and ears 126. Jaw 122 is periodically moved about its pivotal connection by a toggle link 128, one section 130 of which is adjustably attached to jaw 122 through the medium of screw-threads 132 which, when pin 134 is withdrawn, will allow rotating section 130 to increase or decrease the distance between the edge of jaw 122 and the pivotal connection 134 between section 136 of the toggle link and turn-table 90. Section 136 of toggle link 128 is in the form of a bell crank lever, the knee of which is pivotally mounted as pivotal connection 134 joins one free end to section 130. The other free end of this bell crank lever section 136 extends into yoke 138 that is carried by arm 140. Yoke 138 is wide enough to permit freedom of movement of section 136 when turn-table 90 is moved about its axis of rotation which is directly above the yoke. This arm is pivotally secured as at 142 to a fixture 144, mounted on the under side of top 10 and a link 146 joins one end of arm 140 with rocker arm 42. Pin 148 serves to join rocker arm 42 to arm 140 and the position of pin 148 is to one side of pintle 44 so that the parts will operate as hereinafter set down.

Means for imparting step-by-step movement to the saw carrier is operated by head 64 coming into contact with plate 150 which lies in the path of travel of head 64 when the latter is moved upwardly by bars 56. Plate 150 is carried by the lower end of screw 152 that passes through foot 154 and which has a head 156 thereon. A spring 158 disposed between head 156 and foot 154 maintains tension upon screw 152 and thereby precludes accidental maladjustment. Foot 154 is integral with arm 160 upon the free end of which is mounted dog 162; one end of dog 162 is formed to progressively engage teeth 86 of saw 88 and a spring 164 yieldably maintains this said free end of dog 162 against the teeth of the saw.

Foot and arm 154 and 160 respectively, swing about the axis of pin 166 as a unit. Spring 168 yieldably maintain these parts at one end of their path of travel and a stop bolt 170 adjustably carried by a portion of standard 172, limits the movement of arm 160 in one direction. There are two standards 172 mounted upon turn-table 90 so that in the event the mechanism for imparting step-by-step movement to the saw carrier is to be disposed so that the saw is forced along a direction opposite to that indicated by the arrow in Fig. 3, the parts just described may be removed and mounted upon the standard 172 which is shown in Fig. 3 to be without the necessary elements to act upon the saw.

The drawings illustrate an ordinary hand saw 88 being sharpened but it is obvious to one skilled in the art that band saws or saws of other characters than that illustrated, may be sharpened and teeth formed therein by the machine embodying this invention. Turntable 90 is shown positioned so that rail 94 extends laterally from frame 8 in a line perpendicular to the longitudinal axis of said frame and perpendicular to the path of travel of the file holder 62. Obviously, turn-table 90 may be positioned to cause file 70 to act upon teeth 86 in the desired way as is known in the art.

The operation of an automatic saw filing machine such as has been described above is as follows:

Saw 88 is positioned on plate 96 and beneath file 70 so that the latter will form teeth or engage the edges of the saw forming the teeth at the desired angle. Turn-table 90 is secured in place by lock 112 and screws 152 and 170 are set so that saw 88 is advanced in a step-by-step movement to allow file 70 to progressively enter between each of the successive teeth 86 of the saw.

As the motor rotates crank 32, head 64 of the file holder will reciprocate upon bars 56. Rocker arm 42, being operated by link 38 so that rod 50 will move vertically, will cause the ends of bars 56 to raise and lower about the axes of aligned stub shafts 58. The timing of the parts which raise and lower bars 56 and move head 64 is such as to cause the file 70 to work upon the teeth of the saw when the file is being moved in the direction of the arrow shown in Fig. 2. When the file is so moving, bars 56 are at the lower end of their vertical path of travel. When file 70 is moving in the direction opposite to the arrow shown in Fig. 2, bars 56 are at the upper end of their vertical path of travel and therefore, file 70 is not engaging the saw. When bars 56 are at the upper end of their path of travel and when file 70 is being moved back to the point of beginning, and in a direction opposite to the arrow shown in Fig. 2, the means for imparting step-by-step movement to saw 88 is forcing the saw to a position where file 70 will engage the next tooth. Obviously, this movement is imparted to the saw by plate 150 being engaged by head 64. The raising of this plate 150 to move foot and arm 154 and 160 about the axis of element 166 will force dog 162 in the direction of the arrow shown in Fig. 3 and thereby move saw 88 and plate 96 longitudinally a short distance which is governed by the amount of upward travel imparted to plate 150. This movement may be varied by adjusting bolt 152. It is imperative that saw 88 be rigidly held while file 70 is moving in the direction of the arrow shown in Fig. 2 and while the cutting action is taking place. Saw 88 travels along between jaws 118 and 122 and when bars 56 are at their lower end of their vertical path of travel and while file 70 is being drawn in the direction of the arrow, movable jaw 122 is cooperating with jaw 118 to grip saw 88 at a point between plate 96 and the file. Parts 138, 140 and all of toggle link 128 are arranged so that said link 128 is forcing jaw 122 against the saw at the proper aforesaid time. A downward movement on the part of yoke 138 will draw the free end of the bell crank lever 136 about the axis of pin 134 and section 130 of the toggle link 128 will be drawn tight so as to force movable jaw 122 against the saw. As soon as the parts are disposed so that dog 162 is brought into play to move the saw longitudinally, jaws 118 and 122 have released their hold by the breaking of toggle link 128 so as to withdraw movable jaw 122 from a position against the saw.

Manifestly the foregoing detailed description of the illustrated embodiment of the invention and minute explanation of the operation of my automatic saw filing machine will permit one skilled in the art to understand the invention as claimed herein. It is conceivable that machines for sawing files having physical characteristics other than those shown and explained may be made to embody the concepts of the invention without departing from the scope of the appended claims.

Having thus described the invention, what is claimed as new and desired to be secured by Letters Patent is:

1. In a saw filing machine, a saw carrier; a file holder; means for imparting reciprocating movement to the file holder; a turn table having a slot; a pair of holding jaws for the same mounted on the turn table, one of said jaws being rigidly mounted on the turn table, the other of said jaws being pivotally mounted on the turn table for movement toward and from the rigid jaw; and mechanism for positioning said jaws into gripping engagement with the saw while the file holder moves through its path of travel in one direction, comprising a motor, a bell-crank lever pivotally mounted on the turn table, a section connecting one end of said bell-crank lever and the pivotal jaw and having pivotal connection with the bell-crank lever, a yoke provided with an elongated slot in operative engagement with the other end of said bell-crank lever, said lever being projected through the slot in the turn table to engage the yoke, and linkage operably connecting the motor and said yoke, said other end of the bell-crank lever being disposed in the said slot for movement therealong as the turntable is rotated whereby motion may be imparted to said mechanism when the turntable is in one of a number of different positions.

2. In a saw filing machine, a saw carrier; a file holder; a turn table having a slot; a pair of holding jaws for the same mounted on one side of the turn table, one of said jaws being rigidly mounted on the one side of the turn table, the other of said jaws being pivotally mounted on the one side of the turn table for movement toward and from the rigid jaw; and mechanism for positioning said jaws in gripping engagement with the saw while the file holder moves through its path of travel in one direction, comprising a motor, a bell-crank lever pivotally mounted in a vertical position on the one side of the turn table, a section connecting one end of said bell-crank lever and the pivotal jaw and having pivotal connection with the bell-crank lever, a yoke adjacent the other side of the turn table and provided with an elongated slot in operative engagement with the other end of said bell-crank lever, said lever being projected through the said slot in the turn table to engage the yoke at a point near the axis of the turn table, and linkage operably connecting the motor and said yoke, said other end of the bell-crank lever being disposed in the said slot for movement therealong as the turn table is rotated whereby motion may be imparted to said mechanism when the turn table is in one of a number of different positions.

FREDERICK H. DALE.